United States Patent
Waite

(10) Patent No.: US 12,030,800 B2
(45) Date of Patent: Jul. 9, 2024

(54) CHEMICAL METHOD FOR CONCURRENT REMOVAL OF AMMONIA NITROGEN AND PHOSPHORUS FROM FLUID

(71) Applicant: Ferrate Solutions Corp, West Melbourne, FL (US)

(72) Inventor: Thomas D. Waite, Melbourne, FL (US)

(*) Notice: Subject to any disclaimer, the term of this patent is extended or adjusted under 35 U.S.C. 154(b) by 103 days.

(21) Appl. No.: 17/592,494

(22) Filed: Feb. 3, 2022

(65) Prior Publication Data

US 2022/0242768 A1 Aug. 4, 2022

Related U.S. Application Data

(60) Provisional application No. 63/145,549, filed on Feb. 4, 2021.

(51) Int. Cl.

| C02F 9/00 | (2023.01) |
|---|---|
| C02F 1/52 | (2023.01) |
| C02F 1/66 | (2023.01) |
| C02F 1/76 | (2023.01) |
| C02F 101/10 | (2006.01) |
| C02F 101/16 | (2006.01) |

(52) U.S. Cl.
CPC ............ *C02F 9/00* (2013.01); *C02F 1/5245* (2013.01); *C02F 1/66* (2013.01); *C02F 1/76* (2013.01); *C02F 2101/105* (2013.01); *C02F 2101/16* (2013.01)

(58) Field of Classification Search
CPC ............ C02F 2101/105; C02F 2101/16; C02F 1/5245; C02F 9/00; C02F 1/72; C02F 1/66; C02F 1/76; C02F 1/52
See application file for complete search history.

(56) References Cited

FOREIGN PATENT DOCUMENTS

CN 105417698 A * 3/2016

OTHER PUBLICATIONS

Nash, "Review of Options for Ammonia/Ammonium Management", Savannah River National Labratory, pp. 1-25, (Year: 2016).*

(Continued)

*Primary Examiner* — Claire A Norris
(74) *Attorney, Agent, or Firm* — Lowndes

(57) ABSTRACT

A method of treating water with a combined chlorine-ferrate (VI) mixture to convert reduced nitrogen compounds electively to a nitrogen gas via controlled oxidation processes, and simultaneously generating insoluble precipitates of iron-phosphorus compounds $Fe_x(PO_4)_y$, by addition of said compounds in combination wherein chlorine is added within the range of about a weight ratio ($FeO_4^{2-}/NH_3$) of 2-25, and ferrate(VI) is added within the range of about a weight ratio ($FeO_4^{2-}/NH_3$) of 1.0 to 10.0, with pH & Eh adjustment as defined in disclosures, to establish an alkaline environment and oxidation state of between 0 and 6, and reaction kinetics control of between one and twelve minutes, thereby controlling the oxidation process wherein the product of said oxidation process is a nitrogen gas, which is released, while simultaneously generating a settleable precipitate of iron phosphate, thereby yielding a treated effluent with a reduced total nitrogen and phosphorus content in one treatment.

20 Claims, 2 Drawing Sheets

(56) References Cited

OTHER PUBLICATIONS

Jiang et al "Progress in the development and use of ferrate(VI) salt as an oxidant and coagulant for water and wastewater treatment", Water Research 36, pp. 1397-1408 (Year: 2002).*
Yang, English Machine translation, CN 105417698A, pp. 1-6 (Year: 2016).*

* cited by examiner

US 12,030,800 B2

CHEMICAL METHOD FOR CONCURRENT REMOVAL OF AMMONIA NITROGEN AND PHOSPHORUS FROM FLUID

CROSS-REFERENCE TO RELATED APPLICATIONS

This application claims priority to U.S. Provisional Patent Application No. 63/145,549, entitled CHEMICAL METHOD FOR CONCURRENT REMOVAL OF AMMONIA NITROGEN AND PHOSPHORUS FROM WATER, filed Feb. 4, 2021, which is incorporated herein by reference in its entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM

Not applicable.

STATEMENT REGARDING PRIOR DISCLOSURES BY THE INVENTOR OR A JOINT INVENTOR

Not applicable.

BACKGROUND OF THE INVENTION

Field of Invention

The present disclosure generally relates to a system and method for the concurrent removal of reduced ammonia nitrogen and phosphorus compounds from a volume of fluid; more specifically, to the removal of nitrogen and phosphorus compounds from waters such as wastewater produced by wastewater treatment plants, or ground or surface waters, which comprise excess reduced nitrogen and phosphorus due to various factors such as, for example, excess ammonia nitrogen and phosphorus due to agricultural activities or wastewater treatment.

Description of Related Art

The United States Environmental Protection Agency ("EPA") in 2014 described "nutrient pollution" as the most widespread, costly and challenging environmental problems, caused by excess nitrogen discharges from wastewater treatment plants ("WWTPs") and agricultural activities. Surface water quality standards regulating nutrient levels are becoming more stringent. WWTPs in many regions are not able to reliably treat domestic waste to a low enough level with current treatment technologies, to meet surface water standards. In addition, entire water basins (e.g. Everglades) are being managed by limiting total nutrient mass loading into the area. Therefore, there is a growing need for technologies that can reduce nutrient concentrations in waste streams to very low levels (even below standards) so that other difficult-to-control nutrient fluxes can be tolerated. The primary deterrent to the discovery of technologies for removing both major nutrients (nitrogen and phosphorus) is that their environmental chemistry is fundamentally different. Currently, only complex, cumbersome, and expensive biological treatment systems can be utilized to remove both nutrients. No simple, reliable and inexpensive chemical systems have been discovered.

Prior work within the field of the invention, related to the oxidation of ammonia and the decomposition of potassium ferrate(VI), have concluded that "the practical application of the process at present appears not feasible." *Oxidation of Ammonia in Water by Ferrates (VI) and (IV)*, Karlis Svanks, WATER, U.S. Dept. of the Interior, June 1996. In this study, the removal of ammonia from the water sample only reached 27%, and the conditions responsible for the reactions were not discovered.

Still further, in a report published by Savannah River National Lab, *Review of Options for Ammonia/Ammonium Management*, C. A. Nash, May 6, 2016, it was concluded that ferrate ($FeO_4^{2-}$) salts are strong oxidizers, though they are relatively unstable, especially if the solution pH is not alkaline. Svanks assessed the process for the secondary treatment of wastewaters that contain ammonia and concluded that the process is not practical. While potassium ferrate will oxidize ammonia in solution (Svanks found pH 10 to 11 to be optimal), the process was not efficient and ferrate(VI) evolved oxygen by competing decomposition reactions. In addition to the inefficiency, the end products of potassium ferrate use are potassium hydroxide and iron hydroxide. If this were applied to the current application, significant amounts of total solids would have to be handled and disposed." *Review of Options for Ammonia/Ammonium Management* at ¶2.4.6. Coupling the addition of chlorine (HOCl, OCl⁻) with ferrate in a specific ration will increase ammonia removal efficiency while reducing the amount of total solids generated.

Past studies with ferrate(VI), have demonstrated this chemical's ability to oxidize reduced nitrogen. It has been shown that ferrate(VI) can oxidize all forms of reduced nitrogen, but in most studies it converted these compounds to oxidized species which remain in solution. Therefore the total nitrogen is not removed from solution. Theoretically, ferrate(VI) can convert the reduced nitrogen directly to a gas that may be released to the atmosphere, (see FIG. 1) but reaction conditions for this chemistry to work at high efficiency are unknown.

What is still recognized as a long felt need in the art, therefore, is a formulation and method for using a ferrate (VI) based treatment to efficiently and effectively remove ammonia nitrogen and phosphorus compounds from solution in a minimum number of steps, and with a minimum generation of ferric hydroxide and oxidized species of nitrogen.

Any documents or publications cited in this disclosure are incorporated by reference in their entirety, to the extent they are not inconsistent with the explicit teachings set forth herein.

BRIEF SUMMARY OF THE INVENTION

The present invention comprises an apparatus and method that have one or more of the following features and/or steps, which alone or in any combination may comprise patentable subject matter.

An object of this invention is to achieve a chemical method that can reliably remove both total nitrogen and total phosphorus from water in a single step. Another object of this invention is the development of a process that can effectively remove nitrogen and phosphorus nutrients to very low levels in water. An additional object of this invention is to develop a process that will remove many non-target contaminates from water via combined oxidation and precipitation reactions generated by a ferrate(VI) treatment system. A further object of this invention is to develop a process that will coagulate suspended insoluble precipitates in water, so that they may be removed by, for example, sedimentation, centrifugation, or filtration.

The present invention overcomes the shortcomings of the prior art in that it is a formulation combining ferrate(VI) under specific, controlled, conditions with chlorine (NaCl) wherein reduced nitrogen compounds are effectively converted to gaseous species of nitrogen, and ferrate(VI) is reduced to a coagulating agent [$Fe(OH)_2$ and $Fe(OH)_3$] (see EQN. 2, below) under controlled conditions, thereby precipitating phosphorus as an insoluble iron phosphate complex {$Fe(PO_4)$ or $Fe_3(PO_4)_2$}. This process was heretofore unknown in the art, and represents a significant advancement in the state of the art.

In an embodiment, the invention is a method for concurrent removal of nitrogen and phosphorus from water, comprising the steps of providing a treatment volume of water, said water containing reduced nitrogen compounds in any concentration (mass/vol.), and any phosphorus concentration (mass/vol.); mixing said treatment volume using any type of mixer; adding to said treatment volume a mixture of chlorine ($Cl_2$, HOCl, $OCl^-$) combined with ferrate(VI) present in a 50% caustic ($OH^-$) solution. The combined ferrate (VI) and chlorine blend is added at a dose of 3-12 times the reduced nitrogen concentration in the water, on a weight basis; adjusting the pH of the mixture to 7-11 with any acid if needed; mixing said ferrate(VI) solution and treatment volume at a medium speed (65 rpm-150 rpm) for a reaction time of between 2 minutes to 15 minutes; adding an acid solution of ferric iron to create a treated volume; mixing the treated volume at slow speed (20 rpm-60 rpm) for a coagulation time of 5 minutes to 15 minutes to produce an insoluble precipitate; and removing the insoluble precipitate from the treated volume; wherein reduced nitrogen has been oxidized to a gaseous form that escapes to the atmosphere, and the phosphorus is removed in the insoluble ferric precipitate.

Accordingly, it is an object of the present invention to provide a chemical method for concurrent removal of ammonia nitrogen and phosphorus from fluid.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating the preferred embodiments of the invention and are not to be construed as limiting the invention. In the drawings.

DETAILED DISCLOSURE OF THE INVENTION

Figure 1:
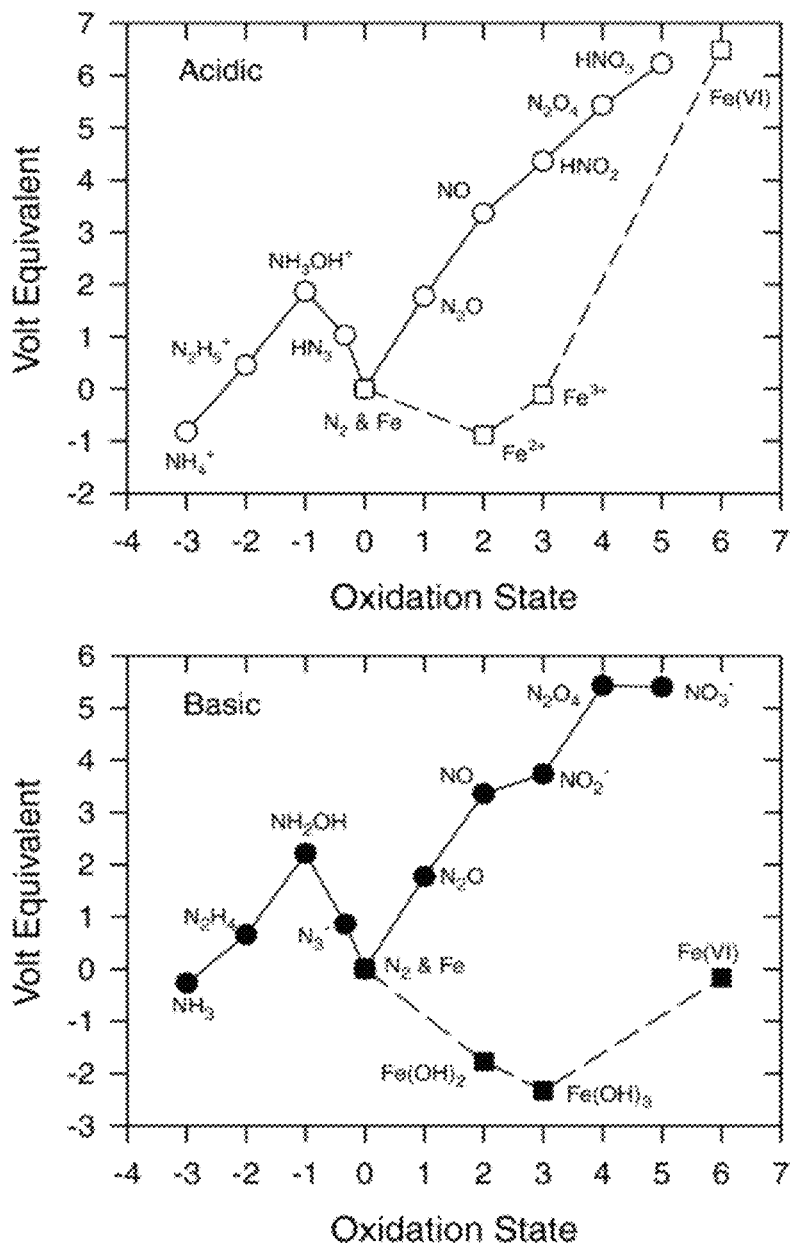
FIG. 1 depicts prior-art oxidation potential-free energy diagrams.
Figure 2:
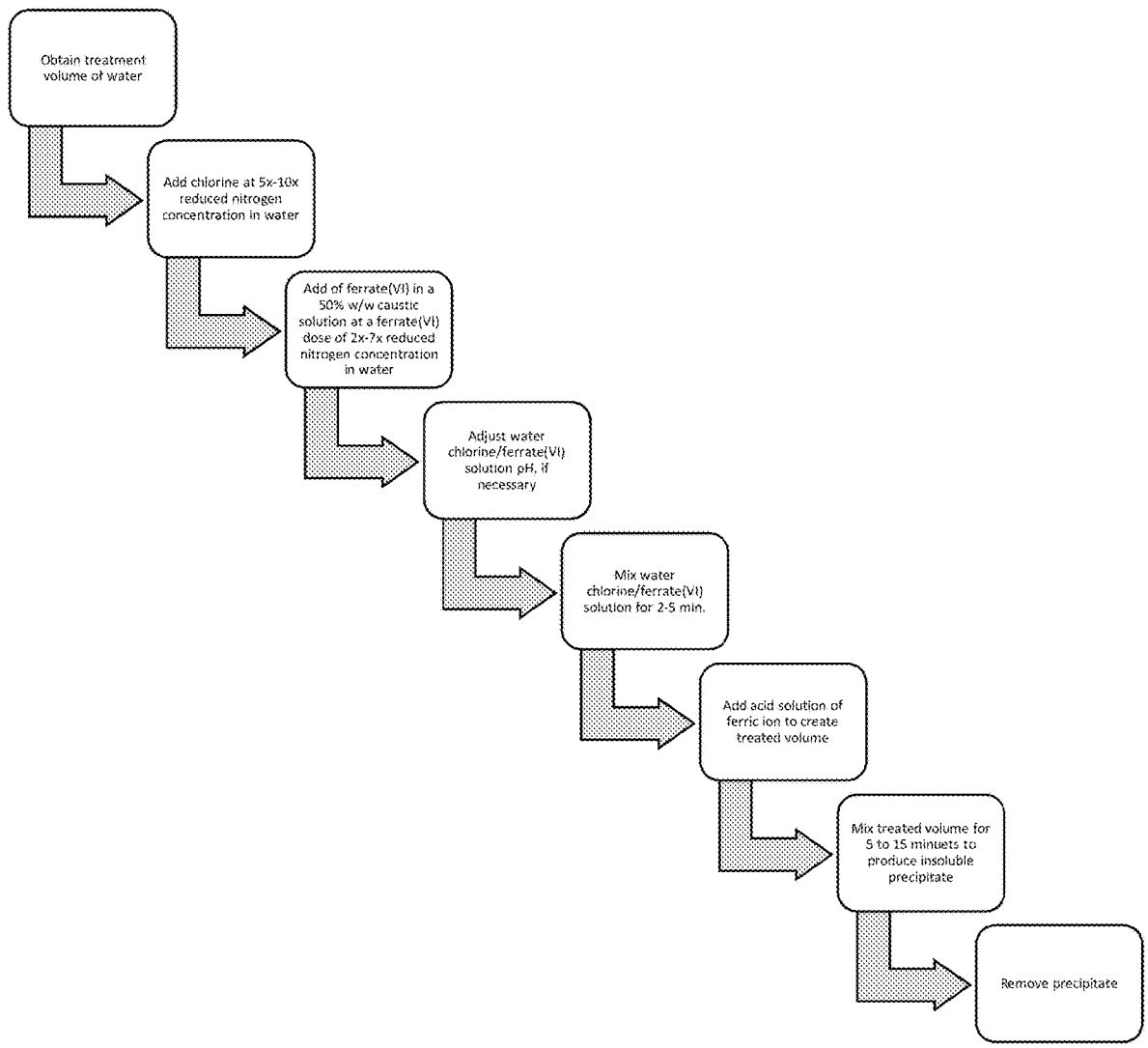
FIG. 2 depicts a flow chart of the method according to aspects of the invention.

Iron-VI ferrate itself has been studied for many years, and countless publications have been produced describing its potential for use in industry. A significant literature base also exists for environmental applications of this compound. Ferrates are oxo-anions of iron and have been synthesized in laboratories since the mid-nineteenth century, with the iron in oxidation states of between two and eight ($FeO_2^{2-}$ and Feat). While several different ferrates have been studied for commercial exploitation, only ferrate(VI), i.e. ($FeO_4^{2-}$) has been utilized for environmental applications.

Ferrates can be synthesized in several ways, utilizing an oxidation process to convert metallic, ferrous, or ferric iron to a higher valence. The most efficient and cost-effective way to generate ferrate(VI) is by aqueous chemical oxidation of ferric iron utilizing chlorine in a caustic medium. This is the technology currently used to generate the only commercial ferrate(VI) product available in the world. Specifically, a ferric salt, preferably either ferric chloride or ferric sulfate is oxidized to $FeO_4^{2-}$ by hypochlorite (either calcium or sodium) in the presence of a strong base such as sodium hydroxide, as shown in equation ("EQN.") (1) below.

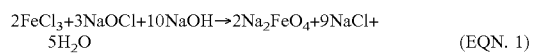

$$2FeCl_3+3NaOCl+10NaOH \rightarrow 2Na_2FeO_4+9NaCl+5H_2O \quad (EQN. 1)$$

When added to aqueous systems, ferrate(VI) is a powerful oxidant which readily decomposes to ferric iron [$Fe(OH)_3$] and oxygen according to:

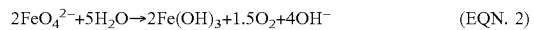

$$2FeO_4^{2-}+5H_2O \rightarrow 2Fe(OH)_3+1.5O_2+4OH^- \quad (EQN. 2)$$

Ferrate(VI) is known as strong oxidant, and early researchers in Germany (1843-1897) worked on ferrate(VI) oxidations including ferrate(VI)/ammonia reactions. Specifically, they observed that ammonium salts rapidly reduced ferrate(VI) solutions, meaning these reactions were almost instantaneous. One researcher reported (a note only, no publication found) that some of the ammonium was oxidized to nitrogen gas (without presenting data) by potassium ferrate(VI). The literature does not report any further work on these ferrate(VI) reactions until 1950, when a group, also in Germany, (Halferich, B., and K. Lang, Z. Anorg. Allg. Che., 263, 169) reported that ammonium ion was converted to nitrate ($NO_3^-$) and nitrite ($NO_2^-$) by potassium ferrate(VI) in acid conditions.

Twenty-five years later, a laboratory study undertaken at the Ohio State Univ. (1976, K. Svanks, *Oxidation of Ammonia in Water by Ferrates (VI) and (IV)*, Rpt. #444, Ohio State University Water Resources Center) re-visited the chemistry of ferrate/ammonia oxidations. They reported that ferrate (VI) did oxidize some ammonium ion to $N_2$ gas, and that the rate appeared to be dependent on the pH. They also noted that mostly nitrite ($NO_2^-$), and nitrate ($NO_3^-$) species were formed in their studies. They assumed the oxidation of ammonia by potassium ferrate could proceed according to the three overall reactions:

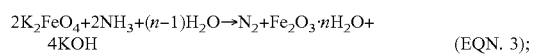

$$2K_2FeO_4+2NH_3+(n-1)H_2O \rightarrow N_2+Fe_2O_3 \cdot nH_2O+4KOH \quad (EQN. 3);$$

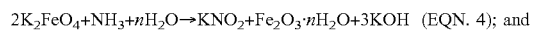

$$2K_2FeO_4+NH_3+nH_2O \rightarrow KNO_2+Fe_2O_3 \cdot nH_2O+3KOH \quad (EQN. 4); \text{ and}$$

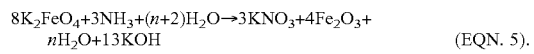

$$8K_2FeO_4+3NH_3+(n+2)H_2O \rightarrow 3KNO_3+4Fe_2O_3+nH_2O+13KOH \quad (EQN. 5).$$

Their research, however, was unable to define the correct conditions to optimize the reaction denoted in EQN. 3, and their observed yields of $N_2$ gas were very low, which led to their conclusion: " . . . the practical application of the process at present appears to be not feasible." A few other researchers have explored ammonia oxidation by ferrate(VI), but none could determine the process chemistry required to control the oxidation reaction necessary to form a nitrogen gas and all found nitrate as an end product (see, for example, *Quality Improvements of Biosolids by Ferrate(VI) Oxidation of Offensive Odor Compounds*, Water Science & Technology, 33(3):119-130, January 1996).

The present invention describes the chemical formulation and reaction conditions for using a combined chlorine plus ferrate(VI) based method that efficiently generates a nitrogen gas directly from reduced nitrogenous compounds, while creating a precipitation mechanism for phosphorus removal, thus providing for a method and system of concurrently removing nitrogen and phosphorus from a fluid, preferably water.

In an embodiment, the invention comprises a chemical method for concurrent removal of nitrogen and phosphorus from water that is based on the following procedure. A volume of water containing reduced nitrogen compounds in any concentration (mass/vol.), and any phosphorus concentration (mass/vol.) is obtained. The volume water is mixed on any type of mixer, and an alkaline mixture of ferrate(VI) [0.2%-8%], in a 50% caustic ($OH^-$) solution, coupled with chlorine ($Cl_2$, $HOCl$, $OCl^-$) is added at a dose of 2-7 times the reduced nitrogen concentration in the water, on a weight basis. The pH of the mixture is adjusted to 7-11 with any acid if needed. The ferrate(VI)/chlorine solution and water sample are mixed at a medium speed (65 rpm-150 rpm) for a reaction time of 2 min-15 min. An acid solution of ferric iron is then added at a dose of 1-5 times the phosphorus concentration in the water (Fe/P) on a weight basis, and a pH=6-9. The treated sample is then mixed at slow speed (20 rpm-60 rpm) for a coagulation time of 5 min-15 min. The precipitate is then removed from the water sample by sedimentation, centrifugation, filtration or any other known method of removing a precipitate from a solution. The reduced nitrogen has been oxidized to a gaseous form that escapes to the atmosphere, and the phosphorus is removed in the insoluble precipitate.

Following are examples illustrating procedures for practicing the invention. These examples should be construed to include obvious variations and not limiting.

EXAMPLE 1. First, a 900 mL sample of surface water containing ammonia at 38.0 mg/L, and phosphate phosphorus at 2.1 mg/L is secured as a treatment volume in a 1000 mL vessel. A solution of chlorine (8 mg/mL) was prepared and added to the treatment volume in a ratio of 5:1 to the ammonia. The water/chlorine mixture was mixed at 200 rpm for 15 minutes. A solution of ferrate(VI) (0.2-8%) in 50% w/w NaOH is prepared and added to the treatment volume in a 3:1 ($FeO^{2-}/NH_3$) ratio. The pH of the ferrate(VI)—water sample mixture is 8.97. The mixture is then mixed at 200 rpm for 15 minutes. Next, a 60% solution of ferric sulfate (or chloride) in acid is added to reduce the pH to about 7.5. The mixture is then mixed for 15 minutes at 20 rpm to produce a treated volume. Mixing is then stopped, and the particulates are allowed to settle for 10 minutes. In this example, ammonia was reduced by 76% and phosphate phosphorus was reduced by 98%. No nitrate or nitrite was formed.

EXAMPLE 2. First, a 500 mL sample of surface water containing ammonia at 26.0 mg/L, and phosphate phosphorus at 2.3 mg/L is secured as a treatment volume in a 1000 mL vessel. A solution of chlorine (8 mg/mL) was added to the sample at a ratio of 10:1 of the ammonia content. This mixture was mixed at 200 rpm for 5 minutes. A solution of ferrate(VI) (0.2-8%) in 50% w/w NaOH is prepared and added said treatment volume in a 3:1 ($FeO^{2-}/NH3$) ratio. The pH of the ferrate(VI)/water sample mixture is 9.38. The mixture is mixed at 200 rpm for 5 minutes. Next, a 60% solution of ferric sulfate (or chloride) in acid is added to reduce the pH to about 7.8. The mixture is mixed for 5 minutes at 20 rpm to produce a treated volume. Mixing is stopped, and the particulates are allowed to settle for 10 minutes. In this example, ammonia was reduced by 90% and phosphate phosphorus was reduced by 70%. No nitrate or nitrite was formed.

EXAMPLE 3. First, a 500 mL sample of surface water containing ammonia at 11.3 mg/L, and phosphate phosphorus at 1.1 mg/L is secured as a treatment volume in a 1000 mL vessel. A solution of chlorine (8 mg/mL) was added to the sample in a ratio of 10:1 to the ammonia content. This is mixed at 200 rpm for six minutes. A solution of ferrate(VI) (0.2-8%) in 50% w/w NaOH is prepared and added to said treatment volume in a 3:1 ($FeO_4^{2-}/NH_3$) ratio. The pH of the ferrate(VI)/water sample mixture is 9.70. The mixture is mixed at 200 rpm for 6 minutes Next, a 60% solution of ferric sulfate (or chloride) in acid is added to reduce the pH to about 7.8. The mixture is mixed for 6 minutes at 20 rpm to produce a treated volume. Mixing was stopped, and the particulates were allowed to settle for 10 minutes. Ammonia was reduced by 99.2% and phosphate phosphorus was reduced by 95.1%. No nitrate or nitrite were formed.

EXAMPLE 4. First, a 500 mL sample of surface water containing ammonia at 11.3 mg/L, and phosphate phosphorus at 1.1 mg/L is secured as a treatment volume in a 1000 mL vessel. A solution of chlorine (8 mg/mL) was added to the sample in a ratio of 10:1 to the ammonia content. This is mixed at 200 rpm for three minutes. A solution of ferrate(VI) (0.2-8%) in 50% w/w NaOH is prepared and added in a 3:1 ($FeO_4^{2-}/NH_3$) ratio. The pH of the ferrate (VI)/water sample mixture is 9.80. The mixture is mixed at 200 rpm for three minutes. Next, a 60% solution of ferric sulfate (or chloride) in acid is added to reduce the pH to 7.60. The mixture is mixed for 3 min at 20 rpm. Mixing was stopped, and the particulates were allowed to settle for 10 minutes Ammonia was reduced by 99.4% and phosphate phosphorus was reduced by 21%.

EXAMPLE 5. First, a 500 mL sample of surface water containing ammonia at 49.7 mg/L is secured as a treatment volume in a 1000 mL vessel. A solution of ferrate(VI) (0.2-8%) in 50% w/w NaOH is prepared and added to said treatment volume in a 10:1 ($FeO_4^{2-}/NH_3$) ratio. The pH of the ferrate(VI)/water sample mixture is about 10.64. The mixture is mixed at 130 rpm for 10 minutes. Next, a 60% solution of ferric sulfate (or chloride) in acid is added to reduce the pH to 7.5. A solution of chlorine (8 mg/mL) was added to the sample in a ratio of 1:10 to the ammonia content. The mixture is mixed for 20 minutes at 30 rpm to produce a treated volume. Mixing is stopped, and the particulates are allowed to settle for 10 minutes. Ammonia was reduced by 54.3%.

The invention described and claimed herein is a method for removing nitrogen and phosphorus compounds from water in a single series of steps, and is useful for water purification such as may be required in waste water treatment and other applications, especially those applications in which water comprises excess nitrogen due to waste water treatment or agricultural use of fertilizer comprising high nitrogen content. The method of the invention is novel and non-obvious but is relatively easy and inexpensive to employ. Thus the present method is an advancement in the state of the art of using a coupled ferrate(VI) plus chlorine process for water purification, with significant beneficial attributes.

The objects of the invention are: to achieve a chemical method that can reliably remove both total nitrogen and total phosphorus from water in a single step; the realization of a method that can effectively remove nitrogen and phosphorus nutrients to very low levels in water; a method that will remove many non-target contaminates from water via combined oxidation and precipitation reactions generated by ferrate(VI) in the presence of added chlorine; and to provide a method that will coagulate suspended solids containing undesired phosphorus compounds, allowing such solids to be easily removed from the treated water volume by methods such as sedimentation, centrifugation, or filtration.

Inasmuch as the preceding disclosure presents the best mode devised by the invention for practicing the invention and is intended to enable one skilled in the pertinent art to carry it out, it is apparent that methods incorporating modifications and variations will be obvious to those skilled in the art. As such, it should not be construed to be limited thereby but should include such aforementioned obvious variations and be limited only by the spirit and scope of the following claims.

I claim:

1. A method for concurrent removal of nitrogen and phosphorus from a liquid, comprising the steps of:
    obtaining a treatment volume of liquid, said liquid containing reduced nitrogen compounds and phosphorus compounds;
    mixing said treatment volume;
    adding chlorine and an alkaline mixture of ferrate(VI) to said treatment volume to create a ferrate(VI)/chlorine solution;
    adjusting the pH of the ferrate(VI)/chlorine solution to between about 9 and 11;
    mixing said ferrate(VI)/chlorine solution at a sufficient speed and time to create a reaction;
    adding an acid solution of ferric iron to said ferrate(VI)/chlorine solution to create a treated volume;
    mixing the treated volume at a sufficient speed and time to produce a precipitate;
    removing the precipitate from the treated volume, wherein reduced nitrogen has been oxidized to a gaseous form that escapes to the atmosphere, and the phosphorus is removed in the precipitate.

2. The method of claim 1 wherein the chlorine, in a gaseous form or in solution, is added at a dose of about 5-10 times the concentration of reduced nitrogen concentration in the liquid.

3. The method of claim 1 wherein said alkaline mixture of ferrate(VI) comprises about a 50% weight by volume caustic hydroxide solution.

4. The method of claim 3 wherein
    said alkaline mixture of ferrate(VI) is further defined to be at about 0.2%-8% concentration of ferrate(VI); and
    said chlorine is further defined to be at about a concentration of 0.03%-12%.

5. A method for concurrent removal of nitrogen and phosphorus from a liquid, comprising the steps of:
    obtaining a treatment volume of liquid, said liquid containing reduced nitrogen compounds in any concentration, and phosphorus compounds in any concentration;
    mixing said treatment volume with a mixer;
    adding chlorine, in a gaseous form or in solution, to said treatment volume at a dose of between about 5 and 10 times the concentration of reduced nitrogen concentration in the liquid coupled with an alkaline mixture of ferrate(VI), in a about 50% weight by volume caustic hydroxide solution, to create a ferrate(VI)/chlorine solution;
    adjusting the pH of the ferrate(VI)/chlorine solution to be between about 9 and 11;
    mixing said ferrate(VI)/chlorine solution at a sufficient speed and time to create a reaction;
    adding an acid solution of ferric iron to said ferrate(VI)/chlorine solution to create a treated volume;
    mixing the treated volume at a sufficient speed and time to produce a precipitate;
    removing the precipitate from the treated volume, wherein reduced nitrogen has been oxidized to a gaseous form that escapes to the atmosphere, and the phosphorus is removed in the precipitate.

6. The method of claim 5, wherein said alkaline mixture of ferrate(VI) is further defined to be at about 0.2%-8% concentration of ferrate(VI); and
    said chlorine is further defined to be at about a concentration of 0.03%-12%.

7. The method of claim 5, wherein the step of adding an acid solution of ferric iron is further defined as adding an acid solution of ferric iron at a dose of between about 2 and 25 times the phosphorus concentration in the liquid, on a weight basis.

8. The method of claim 6, wherein the step of adding an acid solution of ferric iron is further defined as adding an acid solution of ferric iron at a dose of between about 2 and 25 times the phosphorus concentration in the liquid, on a weight basis.

9. The method of claim 5, wherein the step of removing the precipitate from the treated volume is performed by a method selected from the group consisting of: sedimentation; centrifugation; and filtration.

10. The method of claim 6, wherein the step of removing the precipitate from the treated volume is performed by a method selected from the group consisting of: sedimentation; centrifugation; and filtration.

11. The method of claim 7, wherein the step of removing the precipitate from the treated volume is performed by a method selected from the group consisting of: sedimentation; centrifugation; and filtration.

12. The method of claim 8, wherein the step of removing the precipitate from the treated volume is performed by a method selected from the group consisting of: sedimentation; centrifugation; and filtration.

13. A method for concurrent removal of nitrogen and phosphorus from water, comprising the steps of:
    obtaining a treatment volume of water, said water containing reduced nitrogen compounds in any concentration, and phosphorus compounds in any concentration;
    mixing said treatment volume using any type of mixer;
    adding chlorine, in gaseous form or solution, to said treatment volume at a dose of about 5-10 times the concentration of reduced nitrogen concentration in the water coupled with an alkaline mixture of ferrate(VI), in a about 50% weight by volume caustic hydroxide, to create a ferrate(VI)/chlorine solution;
    adjusting the pH of the ferrate(VI)/chlorine solution to between about 9 and 11;
    mixing said ferrate(VI)/chlorine solution at a sufficient speed and time to create a reaction;
    adding an acid solution of ferric iron to said ferrate(VI)/chlorine solution to create a treated volume;
    mixing the treated volume is at a sufficient speed and time to induce coagulation and thereby produce a precipitate;

removing the precipitate from the treated volume, wherein reduced nitrogen has been oxidized to a gaseous form that escapes to the atmosphere, and the phosphorus is removed in the precipitate.

14. The method for concurrent removal of nitrogen and phosphorus from water of claim 13,
wherein said alkaline mixture of ferrate(VI) is further defined to be at about 0.2%-8% concentration of ferrate (VI); and
said chlorine is further defined to be at about a concentration of 0.03%-12%.

15. The method for concurrent removal of nitrogen and phosphorus from water of claim 13, wherein the step of adding an acid solution of ferric iron is further defined as adding an acid solution of ferric iron at a dose of between about 2 and 25 times the phosphorus concentration in the water on a weight basis.

16. The method for concurrent removal of nitrogen and phosphorus from water of claim 14, wherein the step of adding an acid solution of ferric iron is further defined as adding an acid solution of ferric iron at a dose of between about 2 and 25 times the phosphorus concentration in the water on a weight basis.

17. The method for concurrent removal of nitrogen and phosphorus from water of claim 13, wherein the step of removing the precipitate from the treated volume is performed by a method selected from the group consisting of: sedimentation; centrifugation; and filtration.

18. The method for concurrent removal of nitrogen and phosphorus from water of claim 14, wherein the step of removing the precipitate from the treated volume is performed by a method selected from the group consisting of: sedimentation; centrifugation; and filtration.

19. The method for concurrent removal of nitrogen and phosphorus from water of claim 15, wherein the step of removing the precipitate from the treated volume is performed by a method selected from the group consisting of: sedimentation; centrifugation; and filtration.

20. The method for concurrent removal of nitrogen and phosphorus from water of claim 16, wherein the step of removing the precipitate from the treated volume is performed by a method selected from the group consisting of: sedimentation; centrifugation; and filtration.

* * * * *